Figure 1:
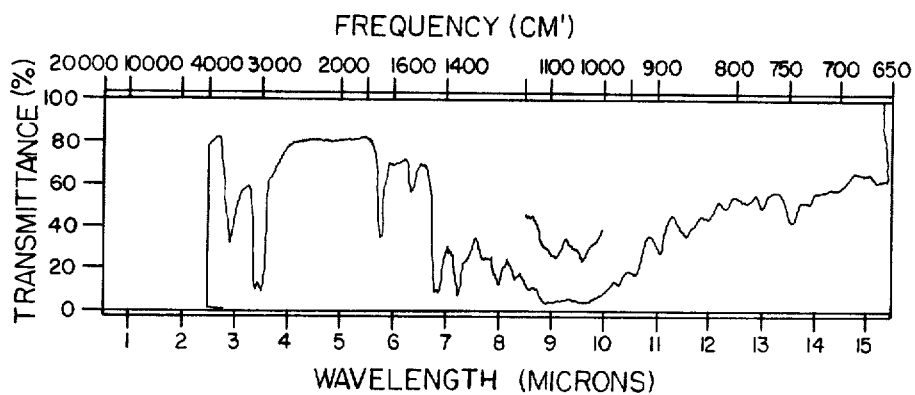

United States Patent [19]

Harris, deceased et al.

[11] 3,901,973

[45] Aug. 26, 1975

[54] ANTIBIOTIC EVERNINOMICIN 1

[75] Inventors: Howard E. Harris, deceased, late of Bloomfield, N.J., by Elfriede A. Harris, executrix, Bloomfield; Carl J. Miskowicz, Garwood, N.J.

[73] Assignee: Schering Corporation, Kenilworth, N.J.

[22] Filed: Nov. 5, 1973

[21] Appl. No.: 413,111

[52] U.S. Cl. ............................................. 424/118
[51] Int. Cl.$^2$............................................. A61K 35/00
[58] Field of Search ................................. 424/118

[56] References Cited
UNITED STATES PATENTS
3,499,078    3/1970    Luedemann et al. ............... 424/118

Primary Examiner—Jerome D. Goldberg
Attorney, Agent, or Firm—Mary S. King; Stephen B. Coan

[57] ABSTRACT

Upon treatment of an everninomicin selected from the group consisting of everninomicin B, everninomicin C and everninomicin D with aluminum amalgam in an aprotic solvent having a dielectric constant less than 15 in the presence of a proton source in an amount substantially equimolar with said everninomicin, there is produced the corresponding hydroxylaminoeverninomicin effective in inhibiting the growth of gram-positive bacteria. A preferred species is that wherein the starting compound is everninomicin D, the aprotic solvent is tetrahydrofuran, the proton source is water and the amalgam is prepared from aluminum foil, whereby greatly enhanced yields of hydroxylamino-everninomicin D are produced over those obtained in the process for preparing hydroxylaminoeverninomicin D comprising treatment of everninomicin D with aluminum amalgam in aqueous alcohol. Also produced is a novel antibacterial substance identified as everninomicin 1.

The isolation and characterization of the antibacterial product mixture obtained in the above process are described as well as the isolation and characterization of the antibacterial substances everninomicin 1 and hydroxylaminoeverninomicin D.

3 Claims, 4 Drawing Figures

INFRARED SPECTRUM OF MIXTURE COMPRISING
HYDROXYLAMINOEVERNINOMICIN D
AND EVERNINOMICIN 1

NUCLEAR MAGNETIC RESONANCE SPECTRUM OF
MIXTURE COMPRISING HYDROXYLAMINOEVERNINOMICIN D
AND EVERNINOMICIN 1

INFRARED SPECTRUM OF
EVERNINOMICIN 1

NUCLEAR MAGNETIC RESONANCE SPECTRUM
OF EVERNINOMICIN 1

ANTIBIOTIC EVERNINOMICIN 1

FIELD OF INVENTION

This invention relates to a process and to compositions-of-matter thereby obtained.

More specifically, this invention relates to a process which comprises treating an everninomicin antibiotic selected from the group consisting of everninomicin B, everninomicin C, and everninomicin D, with aluminum amalgam in an aprotic solvent having a dielectric constant less than 15 in the presence of a proton source in an amount substantially equimolar with said everninomicin whereby is obtained the corresponding hydroxylaminoeverninomicin exhibiting antibacterial activity. With everninomicin D as starting compound, there is produced an antibacterial mixture having at least two antibacterial substances comprising hydroxylaminoeverninomicin D and everninomicin 1. Included within this invention is the antibacterial substance comprising everninomicin 1 thereby obtained.

In particular, a preferred species of this invention relates to the process of treating everninomicin D with an amalgam of aluminum foil in tetrahydrofuran in the presence of water, said water being substantially equimolar with said everinonmicin D, whereby is obtained an antibacterial mixture having at least two antibacterial substances comprising hydroxylaminoeverninomicin D and everninomicin 1, the yield of hydroxylaminoeverninomicin D thereby produced being much greater than that obtained when everninomicin D is treated with aluminum foil amalgam in alcohol, said everninomicins 1 being a composition-of-matter of this invention.

PRIOR ART

Hydroxylaminoeverninomicins are antibacterial substances described in co-pending application of Ashit Ganguly and Olga Sarre for *Reduction Products of Everninomicins and Methods for Their Preparation*, Ser. No. 411,548, filed Oct. 31, 1973. The process for preparing the hydroxylaminoeverninomicins described therein comprises treating an everninomicin antibiotic having a nitro function selected from the group consisting of everninomicin B, everninomicin C, and everninomicin D with aluminum amalgam in aqueous alcohol whereby is produced a product mixture having at least two antibacterial substances and comprising the corresponding hydroxylaminoeverninomicin and nitrosoeverninomicin. A preferred species of the prior art process is that wherein the starting compound is everninomicin D whereby is produced a mixture comprising hydroxylaminoeverninomicin D and nitrosoeverninomicin D, of which hydroxylaminoeverninomicin D is the preferred anti-bacterial agent since it has enhanced activity against gram-positive bacteria as compared with the co-produced nitrosoeverninomicin; moreover, hydroxylaminoeverninomicin D has comparable activity as the starting antibiotic, everninomicin D, when administered by injection as the sodium salt and, advantageously, is more rapidly absorbed, produces higher serum levels, and is more rapidly excreted than is everninomicin D.

By our invention, we have discovered that when an everninomicin selected from the group consisting of everninomicin B, everninomicin C, and everninomicin D is treated with aluminum amalgam in an aprotic solvent having a dielectric constant less than 15, preferably in tetrahydrofuran, in the presence of water in an amount substantially equimolar to said everninomicin (rather than in aqueous alcohol as in the aforementioned prior art process), there is produced the corresponding hydroxylaminoeverninomicin in much greater yields than that produced by the process described in the co-pending application of Ganguly and Sarre. A preferred species of our invention is also that wherein everninomicin D is the starting antibiotic.

By our invention, we have also discovered that when everninomicin D is treated with an amalgam of aluminum foil in tetrahydrofuran in the presence of water substantially equimolar with said everninomicin D, there is obtained a product mixture effective in inhibiting the growth of gram-positive bacteria, said product mixture comprising over 75 percent of the antibacterial substance hydroxylaminoeverninomicin D in admixture with the antibacterial substance identified as everninomicin 1 together with other antibacterial substances, each of said antibacterial substances being effective in inhibiting the growth of gram-positive bacteria.

By our invention, we have also isolated and characterized the antibiotic substance identified as everninomicin 1.

GENERAL DESCRIPTION OF THE INVENTION

The Process Aspect

The process of this invention is an improvement in the process of preparing a hydroxylaminoeverninomicin selected from the group consisting of hydroxylaminoeverninomicin B, hydroxylaminoeverninomicin C and hydroxylaminoeverninomicin D, which comprises treating the corresponding everninomicin selected from the group consisting of everninomicin B, everninomicin C, and everninomicin D with aluminum amalgam in a solvent comprising aqueous alcohol, said improvement comprising carrying out the process in an aprotic solvent having a dielectric constant less than 15 and in the presence of a proton source, said proton source being substantially equimolar to said everninomicin, whereby is produced greater yields of purer hydroxylaminoeverninomicin than in the prior art process which utilizes aqueous alkanol as solvent as described in co-pending application of Ashit Ganguly and Olga Sarre for *Reduction Products of Everninomicins and Methods for Their Preparation*, Ser. No. 411,548, filed Oct. 31, 1973.

Our process is usually carried out at room temperature (although temperatures in the range of −10° to 65°C may be employed) and under an inert atmosphere such as argon or nitrogen (although the reaction may also be carried out in the presence of air). The process is continued until all the starting everninomicin has been consumed as determined by thin layer chromatographic analysis. The product is usually conveniently isolated by treating the reaction mixture with filter cell, filtering, washing the filter cake with the same aprotic solvent employed in the reduction process, then concentrating the combined filtrate and washes in vacuo at about 50°C to a residue comprising the antibacterial product comprising hydroxylaminoeverninomicin usually together with other antibacterial substances. The hydroxylaminoeverninomicin is then isolated utilizing known techniques such as recrystallization, reprecipitation, extraction and chromatographic techniques. The isolated hydroxylaminoeverninomicin or product mixtures containing said hydroxylaminoeverninomicin are advantageously stored under an inert atmosphere, e.g. nitrogen, at cold temperatures, e.g. about 5°–10°C, to minimize undesirable decomposition reactions.

Proton sources contemplated for use in our process are water, hydroquinone, phenols such as 2,6-di-tert-butylhydroxytoluene and 2,6-di-tert-butylhydroxy anisol, lower alkanols having preferably up to eight carbon atoms, such as methanol, ethanol, propanol. Preferred as proton source is water.

Aprotic solvents useful in our process include acetonitrile, dioxane and, preferably, tetrahydrofuran. When dipolar aprotic solvents having a dielectric constant greater than 15, e.g. dimethylformamide, dimethylsulfoxide, formamide and the like, are employed in our process, there are obtained product mixtures comprising minimal to no yields of antibacterial substances comprising hydroxylaminoeverninomicin.

The aluminum amalgam for use in our process is prepared from aluminum and mercuric chloride in alkali according to known procedures. We have found that our process proceeds at a faster rate and produces higher yields of hydroxylaminoeverninomicin when the aluminum amalgam is freshly prepared just prior to use in our reduction process and when the amalgam is prepared with aluminum foil which is comprised essentially of from about 98 to about 99.5% aluminum usually together with trace quantities of at least one member selected from the group consisting of copper, silicone and iron; particularly when it is prepared from the aluminum foil sold commercially under the trade name Reynolds Wrap, which usually comprises about at least 99.35% aluminum and about 0.12% copper. When preparing the amalgam, we usually cut the aluminum foil in 0.5 cm. squares which are then folded at random into ball-like shapes prior to treatment with alkali and mercuric chloride.

A preferred species of our process is that wherein the everninomicin starting antibiotic is everninomicin D, the aprotic solvent is tetrahydrofuran, the proton source is water, and the aluminum amalgam is derived from Reynolds Wrap aluminum foil whereby is obtained an antibacterial mixture all of whose components possess antibacterial activity, said mixture having at least two antibacterial substances comprising the novel antibacterial substance identified herein as everninomicin 1 together with over 75 percent of the antibacterial substance hydroxylaminoeverninomicin D which is described and claimed in the aforementioned co-pending application of Ashit Ganguly and Olga Sarre, Ser. No. 411,548, filed Oct. 31, 1973.

The antibacterial mixture comprising hydroxylaminoeverninomicin D and everninomicin 1 obtained by the preferred species of our process usually has a potency of about 985 γ/ml. as determined by the microbiological assay (also called the bioassay) procedure utilizing the standard agar diffusion techniques described as follows using Staphylococcus aureus ATCC 6538P as test organism: A reference curve is prepared by plotting the dosage-response of the antibacterial agent in ethanol diluted in phosphate buffer at pH 7 upon a medium of the following composition which has been inoculated with the test organism (i.e. S. aureus):

|  | Percent w./v. |
|---|---|
| Peptone | 0.60 |
| Pancreatic digest of casein | 0.40 |
| Yeast extract | 0.30 |
| Beef extract | 0.15 |
| Dextrose | 0.15 |
| Agar | 1.50 |
| pH 6.6 | |

A suspension of the assay organism (S. aureus) is standardized to provide 20 percent transmission at 600 mμ in a colorimeter. The potency of the sample is determined from the reference curve and expressed in terms of units per milligram (a unit being that amount of test substance required to produce an 18 mm. zone of inhibition with a 12.7 mm. disc).

The antibacterial mixture prepared by the preferred species of our process is useful per se as an antibacterial agent in vitro and in vivo against gram-positive organisms. Additionally, there may be isolated therefrom the novel antibacterial substances everninomicin 1 and the known hydroxylaminoeverninomicin D, both of which exhibit narrow spectrum activity against gram-positive bacteria as described hereinbelow under the section entitled "Composition-of-Matter Aspect".

The starting compounds for our process are everninomicin antibiotics having a nitro group, particularly everninomicin B, everninomicin C, and everninomicin D which are known antibiotics produced by the aerobic fermentation of Micromonospora carbonacea var. carbonacea and a variant thereof Micromonospora carbonacea var. aurantia according to procedures known in the art such as described in U.S. Pat. No. 3,499,078. The isolation and purification of everninomicins B and D are carried out essentially as described in the art and the isolation, purification and characterization of everninomicin C are carried out in a similar manner as described herein.

Of antibiotics everninomicins B, C, and D, everninomicin D is most readily available and is a preferred starting compound for our reduction process since there is produced therefrom good yields of hydroxylaminoeverninomicin D, a valuable antibacterial agent as described in said copending application Ser. No. 441,548, filed Oct. 31, 1973. Everninomicin D is a compound of following structural formula I wherein X is nitro, i.e. X is $$-N\diagdown_O^O$$

Y is hydrogen and Z is $$-CH\diagdown_{OCH_3}^{CH_3}$$

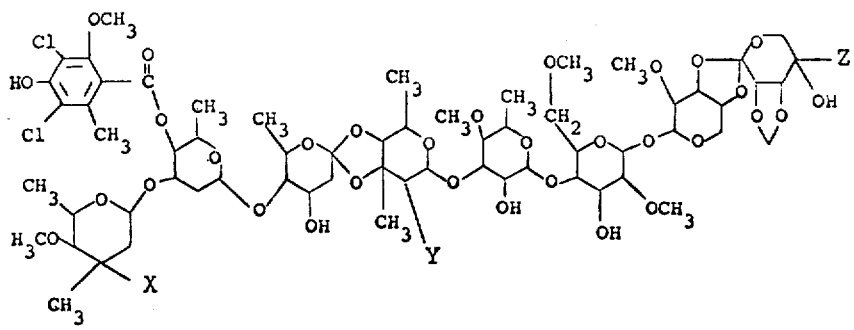

(I)

By our reduction process, the nitro group in the evernitrose sugar group present in everninomicin D, as defined by above structural formula I, is reduced to produce a mixture of products comprising at least two compounds having antibacterial activity; in one, the nitro group has been reduced to a hydroxylamino function (i.e. to a compound of structural formula I wherein X is

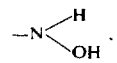

Y is hydrogen and Z is

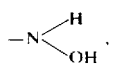

to produce hydroxylaminoeverninomicin D; in another, the nitro portion of the molecule (i.e. the X substituent) is lost whereby is produced the antibacterial substance identified as everninomicin 1 having a structure similar to that of the starting antibiotic everninomicin D, but differing in the evernitrose portion of the molecule, being devoid of a nitro substituent.

Other starting intermediates of our process, i.e. everninomicin B and C, also possess the evernitrose sugar group, the nitro function of which is reduced upon treatment with aluminum amalgam in an aprotic solvent in the presence of a proton source according to our improved process to produce enhanced yields of the corresponding hydroxylaminoeverninomicin; hydroxylaminoeverninomicin B being a compound of formula I wherein X is

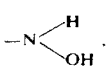

Y is hydroxyl and Z is

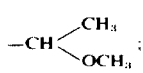

whereas hydroxylaminoeverninomicin C is a compound of formula I wherein X is

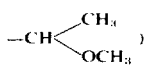

Y is hydrogen and Z is hydrogen.

When carrying out our improved reduction process, it is advantageous to repurify the starting everninomicin antibiotic just prior to treatment thereof with aluminum amalgam in aqueous ethanol, since greater yields of the corresponding hydroxylaminoeverninomicin are produced thereby. Thus, for example, when utilizing everninomicin D as starting antibiotic, it is usually purified just prior to reduction with aluminum amalgam so as to obtain everninomicin D having the following physical constants: $R_f$ of 0.79 in a 60% acetone-40% benzene system:

Specific Optical Rotation: $[\alpha]_D^{26}$ −34.2° (chloroform); Neutralization Equivalent: 1563 (Calculated neutralization equivalent for $C_{66}H_{99}O_{35}NCl_2$=1537); pKa: 7.2;

|  |  | Percent Found | Percent Calculated for $C_{66}H_{99}O_{35}NCl_2$ |
|---|---|---|---|
| Combustion Analysis: | Carbon | 51.64 | 51.56 |
|  | Hydrogen | 6.57 | 6.49 |
|  | Nitrogen | 0.83 | 0.91 |
|  | Chlorine | 4.38 | 4.61 |

This is conveniently accomplished by reprecipitating everninomicin D at least twice in acetone/petroleum ether/ethyl ether followed by further purification of the reprecipitated everninomicin D by elution thereof with acetone-benzene solvent mixtures, then combining the purest fractions as determined by thin layer chromatography. The purified everninomicin D is preferably stored underneath an atmosphere of nitrogen at about 5°C to minimize undesirable side reactions such as hydrolysis and oxidation reactions.

The preferred species of our process is conveniently carried out as follows: Under an atmosphere of nitrogen, to a solution of purified everninomicin D in peroxide-free tetrahydrofuran (about 10 ml. solvent to 1 mg. everninomicin D) add water in an amount substantially equimolar to that of everninomicin D and, with vigorous agitation, add 0.3 grams freshly prepared aluminum foil amalgam (preferably derived from Reynolds Wrap) for each gram of everninomicin D. The reaction is continued until all the starting compound is consumed (usually 1.5 to 2 hours) as determined by thin layer chromatography. The resultant product may be isolated by any of several known techniques. We have found a convenient method is to simply add filter cell to the reaction mixture, filter, wash the filter cell filter cake with peroxide-free tetrahydrofuran, then concentrate the combined filtrate and washes in vacuo to a white solid residue comprising a mixture of at least two antibacterial substances comprising everninomicin 1 and, usually, about 78% hydroxylaminoeverninomicin D, said mixture having physical and chemical characteristics as described in Example 1 herein.

The antibacterial mixture prepared from the preferred species of our process may be separated into its individual components via numerous separation techniques. Applicants prefer chromatography of the mixture on thin layer chromatographic plates coated with 2000 m$\mu$ of silica gel developed in an equilibrated tank with a 60% acetone-40% benzene solvent system until the solvent front migrates 15 cm. from the origin, drying the plate at 45°C in a vacuum oven, scanning the plate with ultraviolet light, marking the individual $R_f$ areas with a scribe, and removing the silica gel from given $R_f$ areas and extracting the silica gel with acetone. A typical silica gel developed thin layer chromatographed plate will yield the following $R_f$ fractions, the antibiotic potency assay values of which are determined as described hereinabove:

guly and Sarre in copending application Ser. No. 411,548 filed Oct. 31, 1973 whereby the hydroxylaminoeverninomicin D is produced in yields as low as 40 to 50% and is of less pure quality requiring rigorous chromatographic purification techniques with the result that only 10 to 20% yields of purified hydroxylaminoeverninomicin D are isolated due to the ease with which hydroxylaminoeverninomicin D hydrolyzes, which hydrolytic decomposition is potentiated by the long residence time required for chromatographic purification of the hydroxylaminoeverninomicin D prepared by reduction in aqueous alcohol.

We have described in detail the preferred species of our improved process for preparing hydroxylaminoeverninomicins. In similar manner, everninomicin B and everninomicin C, upon treatment with aluminum amalgam in a aprotic solvent in the presence of a proton donor will produce hydroylaminoeverninomicin B and hydroxylaminoeverninomicin C, respectively, in good yields. Thus, when *Micromonospora carbonacea var. carbonacea* or variant thereof is subjected to submerged aerobic fermentation according to known procedures, the thereby produced everninomicin mixture comprising everninomicin B, everninomicin C, and everninomicin D is purified and the everninomicin B, C, and D components are separated utilizing chromatographic techniques such as described hereinbelow in

| Compound Band | Weight | % | Activity* | $R_f$ |
|---|---|---|---|---|
| Front | 2.3 mg. | 1.4 | 154.2 /ml | 1.0 |
| Everninomicin 1 Components | 22.6 mg. | 13.3 | 1125.6 /ml | 0.62–0.79 |
| Hydroxylamino-everninomicin D | 132.8 mg. | 78.3 | 1060.7 /ml | 0.58 |
| Origin | 12.0 mg. | 7.1 | 107.9 /ml | 0.09 |
| | 169.7 mg. | (85% Recovery) | | |

*Activity based upon hydroxylaminoeverninomicin D as standard.

When isolating and purifying everninomicin 1 from the antibacterial mixture obtained in the preferred species of our process, only the $R_f = 0.79$ band of the "Everninomicin 1 components" is extracted with acetone and the acetone extracts concentrated in vacuo at 50°C to yield the novel antibacterial substance everninomicin 1, having chemical, physical, and biological activities as set forth in Example 2 and in the section hereinbelow entitled "Composition-Of-Matter Aspect".

When isolating and purifying hydroxylaminoeverninomicin D from the antibiotic mixture produced by our preferred improvement process, the $R_f$ 0.58 band is extracted from the plate utilizing acetone and the extracts evaporated in vacuo to a residue comprising hydroxylaminoeverninomicin D having physical and biological properties as set forth in Example 1-C. The yields of hydroxylaminoeverninomicin D prepared by my process and isolated and purified as described herein is usually about 78% and sometimes is about 90%. This is a significant yield increase over the yields of hydroxylaminoeverninomicin D obtained when everninomicin D is reduced with aluminum amalgam in aqueous alcohol according to the procedure of Gan- Preparation 3. The purified everninomicin B and everninomicin C, respectively, having physical constants as set forth in Preparations 3C(3) and 3C(2), respectively, are then reduced with aluminum amalgam in an aprotic solvent in the presence of a proton donor (e.g. in aqueous tetrahydrofuran) according to our process to produce hydroxylaminoeverninomicins B and C, respectively, having antibacterial activity as described in copending application Ser. No. 441,548 filed Oct. 31, 1973. Isolation and purification of the hydroxylaminoeverninomicins B and C are carried out utilizing chromatographic techniques similar to those described hereinabove for hydroxylaminoeverninomicin D.

COMPOSITION-OF-MATTER ASPECT

Everninomicin 1

Everninomicin 1 is believed to have a physical structure similar to that of everninomicin D except that it is devoid of nitrogen. Thus, it is believed the structure of everninomicin 1 is similar to that of a compound of formula I wherein Y is hydrogen, and Z is

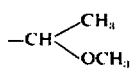

but wherein the substituent X is devoid of nitrogen.

The antibacterial substance identified as everninomicin 1 is a white, amorphous, organic solid which is soluble in aprotic solvents such as tetrahydrofuran, dioxane, acetonitrile, dimethylsulfoxide, formamide and the like, as well as in alcohols such as methanol, ethanol, n-propanol, phenol, acetone; and is insoluble in water, aromatic and aliphatic solvents such as hexane and octane.

Other physical characteristics of everninomicin 1 are listed in Example 2B hereinbelow.

The biological characteristics of antibiotic substance everninomicin 1 are as follows:

Bioassay: 1109 γ/ml when assayed as described hereinabove using hydroxylaminoeverninomicin D as standard:

Everninomicin 1 exhibits antibacterial activity in vitro against gram positive bacteria (e.g. *Staphylococcus aureus* ATCC 6538P and other strains thereof) when tested according to the well-known tube dilution assay in Mueller-Hinton Broth (ph 7.2–7.4) as set forth in Table 1 hereinbelow:

phenethylamine, 1-ephenamine, N,N'-dibenzylethylene-diamine, dehydroabietylamine, N,N'-bis-dehydroabietyl-ethylenediamine and N-(lower)alkylpiperidines, e.g. N-ethylpiperidine. Also included within the term "pharmaceutically aceptable salts" are N-methyl glucamine salts of everninomicin 1 and the antibacterial mixture of this invention.

The pharmaceutically acceptable cationic salts (e.g. the sodium salt of everninomicin 1) are prepared according to known procedures such as by combining equimolar quantities of the corresponding base (e.g. sodium hydroxide) to the everninomicin derivative (e.g. everninomicin 1) in an aqueous solution and lyophilizing the resultant solution of the everninomicin 1 salt.

The pharmaceutically acceptable salts of this invention are white amorphous solids which are water soluble and form stable aqueous solutions. They are, therefore, a particularly preferred species of this invention since they are a convenient vehicle for administering the everninomicin 1 as well as the antibacterial mixture produced when everninomicin D is reduced by the process of our invention. A valuable species of this invention is the sodium salt of everninomicin 1.

Everninomicin 1 and the antibacterial mixture comprising hydroxylaminoeverninomicin D and ever- Table I

| Bacteria | Tube Dilution Assay in Mueller—Hinton Broth (pH 7.2–7.4) for Everninomicin 1 Minimum Inhibitory Concentration mcg./ml. | |
|---|---|---|
| | 24 Hours | 48 Hours |
| Staphylococcus aureus 6538P | 0.3 | 3.0 |
| Staphylococcus aureus Wood | 0.3 | 3.0 |
| Staphylococcus aureus Ziegler | 0.3 | 0.3 |
| Staphylococcus aureus 59H | 0.3 | 0.3 |
| Streptococcus pyogenes C | 0.3 | 0.3 |
| Streptococcus pyogenes 27 | 0.0075 | 0.3 |
| Streptococcus pyogenes Group A Cruz | 0.3 | 0.75 |
| Streptococcus pyogenes Group A Alvarez | 0.075 | 0.075 |
| Bacillus Subtilis 6633 | 0.3 | 0.3 |

Everninomicin 1 also exhibits antibacterial activity in vivo against Staphylococcus and Streptococcus as determined by tests in animals (e.g. dogs or rats) whereby peak serum levels are determined by giving the animal a single dose of everninomicin 1, taking blood samples periodically and assaying the serum thereof for antibacterial activity by an agar-diffusion assay as described by Weinstein et al., *Antimicrobial Agents and Chemotherapy*, p. 24 (1964).

In view of the presence of a phenol in everninomicin 1, as well as in the components of the antibacterial mixture derived from the process of our invention, included within this invention are the pharmaceutically acceptable cationic salts thereof, preferably the sodium salt.

Contemplated as included among the pharmaceutically acceptable cationic salts of this invention are salts of alkali and alkaline earth metals (e.g. sodium, potassium, calcium, aluminum) and ammonium salts and their non-toxic substituted ammonium salts with an amine selected from the group consisting of trialkylamines, procaine, dibenzylamine, N-benzyl-betaninomicin 1 of this invention, including the pharmaceutically acceptable salts thereof, exhibit a narrow spectrum antibiotic activity in vitro against gram-positive bacteria (e.g. *Staphylococcus aureus*, *Staph. W.*, *Streptococcus pyogenes C*, and *Bacillus subtilis*) as demonstrated by the data set forth in Table I hereinabove, the in vitro activity of the mixture comprising hydroxylaminoeverninomicin D and everninomicin 1 and salts thereof being of the same order as that of hydroxylaminoeverninomicin D as disclosed in copending application Ser. No. 411,548 filed Oct. 31, 1973. These compounds are thus advantageously employed as laboratory reagents when attempting to determine the presence of gram-negative organisms. They may be used to inhibit overgrowth of such organisms in culture media, either alone or in combination with other antibacterial agents to reduce or eliminate the heavy overgrowth of gram-positive organisms permitting the determination of gram-negative organisms such as *Klebsiella pneumoniae* or *Escherichia coli* in cultures obtained in diagnostic procedures. As such reagents they may be employed in solution such as in alcohol. In view of their action against gram-positive organisms the antibacterials described herein may be used to "sterilize" equipment such as in operating rooms and in hospital wards.

It is known in the art that ortho esters hydrolyze readily; also, with regard to the hydroxylaminoeverninomicin D component of the antibacterial mixture of this invention, hydroxylamino functions oxidize easily to a nitroso group. In view of the presence of the aforementioned reactive groups, it is preferable to store the everninomicin 1 and the antibacterial mixture of this invention under anhydrous conditions in an inert atmosphere (e.g. under nitrogen, argon, etc.) and at cool temperatures (i.e. about 5°–10°C) to minimize decompsition reactions.

Antibacterial Mixture Comprising Everninomicin 1 and Hydroxylaminoeverninomicin D The antibacterial mixture produced when everninomicin D is treated according to the improved process of this invention has at least two antibacterial substances comprising everninomicin 1 and hydroxylaminoeverninomicin D and is characterized by being a white amorphous solid which is soluble in alcohols (e.g. methanol, ethanol, propanol), acetone, and aprotic solvents such as tetrahydrofuran, dioxane, dimethylsulfoxide, dimethylformamide and the like, and is insoluble in water, aromatic solvents such as benzene and toluene and aliphatic solvents such as hexane and octane.

Other physical characteristics of the antibacterial mixture are described in Example 1.

A typical silica gel thin layer chromatographic plate (2000 $\mu$) of the antibacterial mixture produced from everninomicin D yields the following fractions when developed in an equilibrated tank with a 60% acetone-40% benzene solvent system and viewed in ultraviolet light. The bioassays are obtained by the standard agar diffusion technique described hereinabove:

| Compound Band | Weight | % | Activity* | $R_f$ |
|---|---|---|---|---|
| Front | 2.3 mg. | 1.4 | 154.2 γ/ml. | 1.0 |
| Everninomicin 1 Components | 22.6 mg. | 13.3 | 1125.6 γ/ml. | 0.62–0.79 |
| Hydroxylamino-everninomicin D | 132.8 mg. | 78.3 | 1060.7 γ/ml. | 0.58 |
| Origin | 12.0 mg. | 7.1 | 107.9 γ/ml. | 0.09 |
| | 169.7 mg. | (85% Recovery) | | |

*Activity based upon hydroxylaminoeverninomicin D as standard.

Other biological data of a typical antibacterial mixture of this invention are as follows:

Bioassay: 945γ/ml.;

Bioautogram: 10 mg./2 ml. ethanol, spot 10γ, 20γ, 30γ.

All spots show antibacterial activity.

In vitro spectrum and In vivo activity are similar to that disclosed for hydroxylaminoeverninomicin D as disclosed in copending application Ser. No. 377,344 filed July 9, 1973.

Procedures are set forth hereinbelow to illustrate the best mode contemplated by applicants for carrying out their invention and are not to be construed as limiting the scope thereof.

PREPARATION 1

Purification of Everninomicin D

Everninomicin D, the requisite intermediate, is prepared by cultivating a micro-organism selected from the group consisting of *Micromonospora carbonacea var. carbonacea* NRRL 2972 and *Micromonospora carbonacea var. Aurantiaca* NRRL 2992 under submerged aerobic conditions in an aqueous nutrient medium containing an assimilar source of carbon and nitrogen and isolating everninomicin D from the antibiotic mixture thereby produced by procedures described in U.S. Pat. No. 3,499,078.

Treat a solution of 66 g. of everninomicin D (prepared as described above) in 300 ml. of acetone with 7 g. of charcoal at room temperature. Filter and wash the charcoal with 100 ml. of acetone. Pour the combined acetone filtrate and washes onto a solution of 10.5 liters of petroleum ether (b.p. 60°C) and 2.7 liters of ethyl ether. Filter and dry the resultant precipitate of everninomicin D.

Further purify the thus obtained everninomicin D (about 56 grams) by reprecipitating an acetone (250 ml.) solution thereof with about 10 liters of a solvent mixture comprising petroleum ether/ethyl ether (4:2:1). Filter and dry the resultant precipitate of everninomicin D to a constant weight at 60°C.

Further purify 30 g. of the everninomicin D obtained as described above in a minimum amount of acetone, add 120 g. of fresh silica gel, then evaporate the solvent at 60°C until a constant weight is obtained. Add this mixture to the top of a 5 ft. by 1¾ inch chromatographic column charged with 450 g. of silica gel made up in benzene. Elute the column first with about 7 liters of a solvent mixture comprising 15% acetone-85% benzene, followed by elution with a solvent mixture comprising 20% acetone-80% benzene. Collect 1 liter fractions, monitoring the fractions by thin layer chromatography. Concentrate pooled fractions 8–16 in vacuo at 50°C to a residue comprising everninomicin D (about 18 g.) having an $R_f$ of 0.79 via thin layer chromatography in a 60% acetone-40% benzene system.

Molecular Formula: $C_{66}H_{99}O_{35}NCl_2$; Molecular Weight: 1537 (calc.)

| | | Found | Calc. |
|---|---|---|---|
| Combustion Analysis: | Carbon | 51.64% | 51.56% |
| | Hydrogen | 6.57% | 6.49% |
| | Nitrogen | 0.83% | 0.91% |
| | Chlorine | 4.38% | 4.61% |

Specific Optical Rotation: $[\alpha]_D^{26}$ −34.2° (Chloroform); Neutralization Equivalent: 1563 pKa: 7.2.

Store everninomicin D under an atmosphere of nitrogen at about 5°C.

PREPARATION 2

Preparation of Aluminum Amalgam

To Reynolds Wrap Aluminum Foil (cut into pieces of about 0.5 cm. square), add dilute sodium hydroxide until there is a strong evolution of hydrogen gas. Decant the dilute sodium hydroxide and wash once superficially with water. Decant the water wash and add a 0.5% mercuric chloride solution allowing aluminum to remain in the solution for about 1 to 2 minutes. Decant the mercuric chloride solution. Repeat the entire foregoing procedure, then wash the shiny amalgamated aluminum in turn with water, ethanol, then ether and use immediately in the process described in Example 1.

PREPARATION 3

Preparation and Purification of Everninomicin B, Everninomicin C, and Everninomicin D A. Preparation of Antibiotic Mixture Comprising Everninomicin B, Everninomicin C and Everninomicin D In the manner described in U.S. Pat. No. 3,499,078, Example, 1, prepare a 500 gallon fermentation broth by cultivating a micro-organism selected from the group consisting of *Micromonospora carbonacea var. carbonacea* NRRL 2972 and *Micromonospora carbonacea var. Aurantiaca* NRRL 2992 under submerged aerobic conditions in an aqueous nutrient medium containing an assimilable source of carbon and nitrogen. Extract 500 gallons of fermentation broth with 500 gallons of methylene chloride, then concentrate the methylene chloride extracts in vacuo to a residue having a volume of about 3 liters. Pour the residue into 30 liters of hexane, then filter and air dry the resultant precipitate comprising a mixture of everninomicin B, everninomicin C, and everninomicin D.

B. Separation of Antibiotic Mixture

Prepare the chromatographic column by making a slurry of 11.35 kg. of silica gel (Bakers) in benzene/acetone (60:40). Then transfer the slurry into two 5 ft. × 4 in. columns and allow the columns to settle over night. Place the two columns in series so they will act as one continuous column.

Dissolve 300 g. of the mixture of everninomicin B, C and D prepared as described in Preparation 3A in about 1 liter of benzene/acetone (60:40) with vigorous stirring. Transfer this solution onto the columns.

Elute the column (i.e. the two columns in series) with benzene/acetone (60:40) and collect 1800 ml. fractions. Combine like fractions as determined by thin layer chromatographic analysis (silica gel:benzene:acetone (60:40)). Then evaporate the combined fractions to a residue comprising everninomicin D, everninomicin C and everninomicin B, respectively, as follows:

Fractions 14–18 yield a residue comprising 76.9 g. of everninomicin D; fraction 21 yields a residue comprising 5 g. everninomicin C and combined fractions 22–27 yield a residue comprising 29.5 g. of everninomicin B.

C. Purification of Everninomicin D, C, and B, respectively

1. Everninomicin D

Purify the residue of fractions 14–18 obtained in above Preparation 3B in a manner similar to that described in Example 1A to obtain purified everninomicin D having the physical constants set forth in Example 1A(4).

2. Everninomicin C

Crystallize the residue of fraction 21 obtained as described in Preparation 3B from ethyl acetate to obtain purified everninomicin C having the following properties:

m.p.: 181°–184°C Kofler block; Molecular Formula: $C_{63}H_{93}O_{34}NCl_2$.

| Combustion Analysis: | Found | Calc. |
|---|---|---|
| Carbon | 52.07 | 51.56 |
| Hydrogen | 6.44 | 6.49 |
| Nitrogen | 0.51 | 0.91 |
| Chlorine | 4.72 | 4.61 |

Specific Optical Rotation: $[\alpha]_D^{26}$ −33.7° (Chloroform); Ultraviolet Absorption: $\lambda_{max}^{methanol}$ 208 m$\mu$, $\epsilon_1'$, 19.8; 211 m$\mu$, $\epsilon_1'$, 19.5.

(In this specification, when reporting ultraviolet absorption data, by "$\epsilon_1'$" is meant $\epsilon_{1cm}^{1\%}$, which is defined as the optical density of a 1% solution of a compound measured in a 1 centimeter cell.)

Infrared Absorption Spectrum in chloroform: 2.9, 3.4 (broad), 5.75, 6.32, 6.45, 6.85, 7.1, 7.2, 7.4, 7.7, 8.0, 9.0, 9.6, 10.2, and 11.0 microns.

3. Everninomicin B

Chromatograph 28 g. of everninomicin B prepared as described in above Preparation 3B (i.e. the residue from fractions 22 to 27) on 900 g. of silica gel G (TLC Grade; according to Stahl) eluting with 35% acetone in benzene. Collect 20 ml. fractions and combine like fractions as determined by thin layer chromatographic analysis. Evaporate combined fractions 211 to 310 in vacuo to a residue comprising purified everninomicin B (12.6 g.) having the following properties:

Molecular formula: $C_{66}H_{99}O_{36}NCl_2$; Molecular Weight: 1553 (calc.) m.p.: 184°–185°C Kofler block.

| Combustion Analysis: | Found | Calc. (for $C_{66}H_{99}O_{36}NCl_2 \cdot 2H_2O$) |
|---|---|---|
| Carbon | 50.07% | 49.88 |
| Hydrogen | 6.50% | 6.53 |
| Nitrogen | 0.73% | 0.88 |
| Chlorine | 4.24% | 4.46 |

Specific Optical Rotation: $[\alpha]_D^{26}$ −33° (Chloroform); Ultraviolet Absorption Spectrum: $\lambda_{max}^{methanol}$ 210 m$\mu$ $\epsilon_1'$, 17; 285 m$\mu$ $\epsilon_1'$, 1.5.

Infrared Absorption Spectrum (in chloroform): 2.9, 3.4, 5.75, 6.3, 6.45, 6.85, 7.20, 8.0, 8.5, 9.0, 9.6, 10.2, and 10.5 microns.

EXAMPLE 1

Reduction of Everninomicin D to Produce an Antibacterial Mixture Comprising Hydroxylaminoeverninomicin D and Everninomicin 1

To a solution of 40 g. of everninomicin D (purified as described in Preparation 1) in 400 ml. of peroxide free tetrahydrofuran (previously passed through an alumina column) under a nitrogen atmosphere at room temperature, add 8.8 ml. of distilled water and, while agitating the solution vigorously, add 12 g. of aluminum amalgam freshly prepared as described in Preparation 2. Continue stirring at room temperature under nitrogen until all the starting compound has been consumed as determined by thin layer chromatographic analysis of small samples of the reaction mixture taken at half-hour intervals (reaction time usually about 1.5–2 hours). Add 5g. of dried diatamaceous earth to the reaction mixture, stir for 5 minutes, then allow to stand for 15 minutes. Separate the solid by filtration, washing the filter cake 4 times with 100 ml. portions of peroxide free tetrahydrofuran. Concentrate the combined filtrate and washes in vacuo at 50°C to an amorphous residue (yield about 34.5 g.), which is stored under nitrogen at about 5°C, said white amorphous solid being an antibacterial mixture comprising hydroxylaminoeverninomicin D and everninomicin 1 having the following physical, chemical, and biological properties:

m.p. 190°–200°C Kofler Hot Bench; 170°–180°–190°C Capillary.

| Combustion Analysis: | Carbon | 53.52, | 53.90% |
|---|---|---|---|
| | Hydrogen | 6.75, | 6.94% |
| | Chlorine | 4.14, | 5.11% |
| | Nitrogen | 0.97, | 1.16% |
| | Aluminum | 694 ppm | |
| | Mercury | 2.5 ppm; | |

% Water via Karl Fisher: 0.58%; % Volatility: 5.5%, 110°C at 1 mm. of Hg for 2 hours; Neutralization Equivalent: 1768.4; pKa 7.4; Specific Optical Rotation: $[\alpha]_D^{26}$ −20.9° (methanol); Ultraviolet Absorption Spectrum: $\lambda_{max}^{methanol}$ 293 m$\mu$, $\epsilon_{cm}^{1\%}$, 55.0; 295 m$\mu$, $\epsilon_{cm}^{1\%}$, 78.8.

Figure 2:
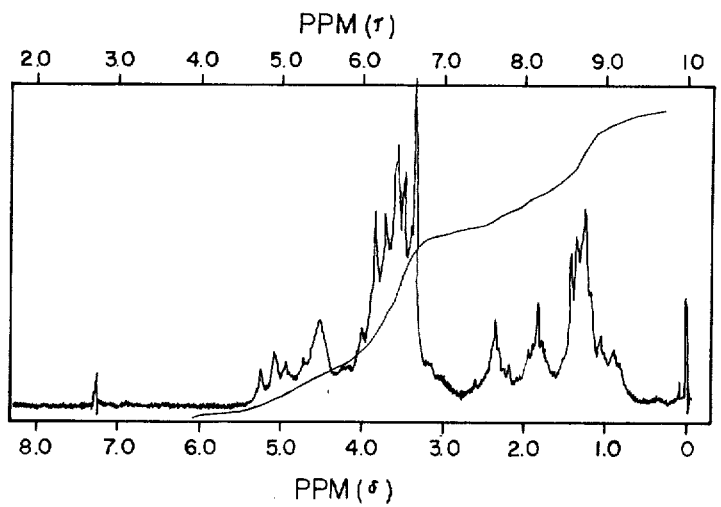

Infrared Absorption Spectrum: in Nujol: 2.93, 5.77, 6.37, 8.00, 8.35, 10.28, 10.55, 11.02, 11.55, 12.00, 12.33, 12.73, 13.00, 13.57 and 13.88 microns (See FIG. 1); Nuclear Magnetic Resonance Spectrum: (See FIG. 2); Bioassay: 945 $\gamma$/ml.

Bioautogram: 10 mg./2 ml. ethanol, spot 10$\gamma$, 20$\gamma$, 30$\gamma$ All spots show activity.

System: Silica gel plates 2000 $\mu$, 60% acetone: 40% benzene, 15 cm. migration ultraviolet scan, streak 200 mg. of antibacterial product mixture.

The Composition of the Antibacterial Product Mixture as Determined by Thin Layer Chromatographic Analysis:

| Compound Band | R$_f$ |
|---|---|
| Front | 1.0 |
| Everninomicin 1 Components | 0.62–0.79 |
| Hydroxylaminoeverninomicin D | 0.58 |
| Origin | 0.09 |

EXAMPLE 2

Isolation and Identification of Components of Antibacterial Product Mixture of Example 1

A. Dissolve a 200 mg. portion of the product mixture prepared as described in Example 1 in reagent grade methylene chloride and streak on an equilibrated precoated (2000 $\mu$ of silica gel) thin layer chromatographic plate 2 cm. from the bottom. Develop in an equilibrated tank with a 60% acetone-40% benzene solvent system until the solvent front migrates 15 cm. from the origin. Dry the plate in a vacuum oven at 45°C, scan the plate with ultraviolet light and mark the individual bands with a scribe, said bands having R$_f$ values as listed in Example 1. Remove the silica gel from each of the R$_f$ bands and extract each with several portions of hot acetone. Filter each of the hot acetone portions and concentrate each in vacuo at 50°C to residues, the weight of each of which and biological activity is listed hereinbelow:

| Compound Band | Weight | % | Activity* | R$_f$ |
|---|---|---|---|---|
| Front | 2.3 mg. | 1.4 | 154.2 $\gamma$/ml | 1.0 |
| Everninomicin 1 Components | 22.6 mg. | 13.3 | 1125.6 $\gamma$/ml | 0.62–0.79 |
| Hydroxylaminoeverninomicin D | 132.8 mg. | 78.3 | 1060.7 $\gamma$/ml | 0.58 |
| Origin | 12.0 mg. | 7.1 | 107.9 $\gamma$/ml | 0.09 |
| | 169.7 mg. | (85% Recovery) | | |

*Activity based upon hydroxylaminoeverninomicin D as standard.

B. Isolation and Identification of Everninomicin 1

Dissolve a 200 mg. portion of the product mixture prepared as described in Example 1 in reagent grade methylene chloride and streak on an equilibrated precoated (2000 $\mu$ of silica gel) thin layer chromatographic plate at a position 2 cm. from the bottom. Develop in an equilibrated tank with a 60% acetone-40% benzene solvent system until the solvent front migrates 15 cm. from the origin. Dry the plate in a vacuum oven at 45°C, scan the plate with ultraviolet light, and remove the silica gel from the area with an R$_f$ of 0.79 and extract the silica gel with several portions of hot acetone. Filter the hot acetone solution and concentrate the filtrate in vacuo at 50°C to a residue comprising everninomicin 1 (yield is 10–20 mg. chromatographic plate). Chemical, physical and biological properties of everninomicin 1 are as follows:

R$_f$ Value: 0.79 of 15 cm. migration in 60% acetone-40% benzene when chromatographed on a thin layer plate having 2000 $\mu$ silica gel; m.p.: 150–160°C.

| | | | Percentage Found | |
|---|---|---|---|---|
| Combustion Analysis: | | Carbon | 50.36, | 50.77% |
| | | Hydrogen | 6.50, | 6.68% |
| | | Chlorine | 4.7% | |
| | | Nitrogen | 0.00 | |
| Neutralization Equivalent: 1587; pKa 7.4; | | | | |

Specific Optical Rotation: $[\alpha]_D^{26}$ −28.5° as measured in dioxane at 1% concentration by the D line of sodium at 25°C; Ultraviolet Absorption Spectrum: $\lambda_{max}^{methanol}$ 293 m$\mu$, $\epsilon_{cm}^{1\%}$, 43.7; 295 m$\mu$, $\epsilon_{cm}^{1\%}$, 139.

Figure 3:
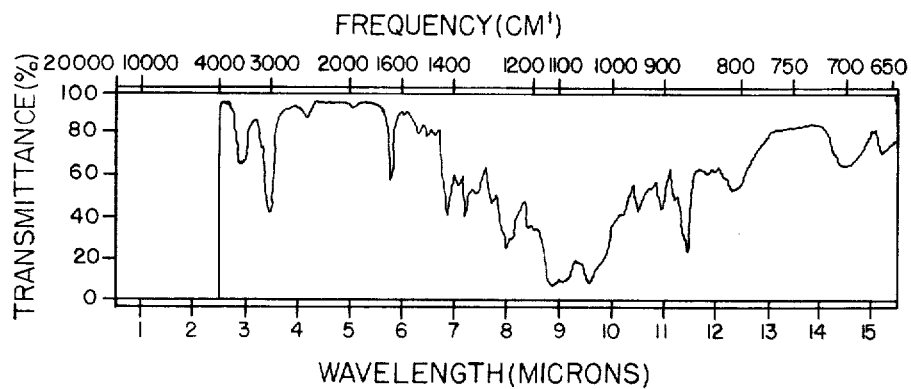

Infrared Absorption Spectrum in chloroform: 2.9, 4.15, 5.75, 6.85, 7.2, 7.95, 8.9, 9.6, 10.5, 10.95, 11.4 (See FIG. 3); Nuclear Magnetic Resonance Spectrum: (See FIG. 4); Bioassay: 1109 $\gamma$/ml., Hydroxylaminoeverninomicin D used as a standard.

C. Isolation and Identification of Hydroxylaminoeverninomicin D

Chromatograph 1 gram of the product mixture prepared as described in Example 1 on a column of 100 g. of silica gel eluting with 6% methanol in benzene at 2–2.5 ml./minute. Monitor the fractions by thin layer chromatography (1:1 acetone-benzene) and combine those fractions having an R$_f$ in the range of from about 0.4–0.5. Concentrate the combined fractions in vacuo to a residue and rechromatograph this residue on silica gel in the same manner as described hereinabove and again combine those fractions having an $R_f$ value within the range of about 0.4–0.5. Evaporate the combined fractions to a residue having the following physical constants:

Molecular Formula: $C_{66}H_{101}O_{34}NCl_2$; Molecular Weight: 1523 (Calc.) m.p.: 174°–176°C (Fisher-John Apparatus).

| | | Found | Calc. |
|---|---|---|---|
| Combustion Analysis: | Carbon | 51.42% | 52.05 |
| | Hydrogen | 6.67% | 6.68 |
| | Nitrogen | 0.75% | 0.92 |
| | Chlorine | 4.83% | 4.66 |

Specific Optical Rotation: $[\alpha]_D^{26}$ −37.9° (chloroform); −23.9° (methanol); Ultraviolet Absorption Spectrum: $\lambda_{max}^{methanol}$ + pH 7 buffer 220 m$\mu$, $\epsilon_1'$, 112; 225 m$\mu$, $\epsilon_1'$, 111; 292 m$\mu$, $\epsilon_1'$, 87; $\lambda_{max}^{methanol}$ + 1N NaOH 296 m$\mu$, $\epsilon_1'$ 84.

EXAMPLE 3

Reduction of Everninomicin C to Hydroxylaminoeverninomicin C

A. In a manner similar to that described in Example 1, treat everninomicin C (prepared and purified as described in Preparation 3) in tetrahydrofuran under nitrogen with aluminum amalgam. Isolate the resultant product in a manner similar to that described to obtain hydroxylaminoeverninomicin C.

B. Purify the crude hydroxylaminoeverninomicin C obtained as described above in a manner similar to that described in Example 2 using silica gel preparative plates (2000 $\mu$ thick) and using 50% acetone-benzene as the developing solvent. Visualize the purified hydroxylaminoeverninomicin C ($R_f$ = 0.27) with ultraviolet light and extract the purified hydroxylaminoeverninomicin C band from the plate using acetone. Combine the acetone extract and distill to a residue comprising purified hydroxylaminoeverninomicin C having the following properties:

Molecular Formula: $C_{63}H_{95}O_{33}NCl_2$; m.p.: 165°–168°C Kofler block.

| | | Found | Calc'd. | |
|---|---|---|---|---|
| Combustion Analysis: | Carbon | 51.35, | 51.74% | 51.64% |
| | Hydrogen | 6.66, | 6.75% | 6.54 |
| | Nitrogen | 0.93, | 1.09% | 0.96 |
| | Chlorine | 5.75% | | 4.84 |

Specific Optical Rotation: $[\alpha]_D^{26}$ −21.6° (methanol; Ultraviolet Absorption Spectrum: $\lambda_{max}^{methanol}$ 212 m$\mu$, $\epsilon_1'$, 17.32; $\lambda_{max}^{methanol}$ 290 m$\mu$, $\epsilon_1'$, 3.33.

Infrared Absorption Spectrum (in chloroform): 2.9, 3.4, 5.8, 6.9, 7.2, 8.0, 9.1, 9.6, 10.25, and 11.0 microns.

EXAMPLE 4

Reduction of Everninomicin B to Hydroxylaminoeverninomicin B

A. In a manner similar to that described in Example 1, treat everninomicin B (prepared and purified as described in Preparation 3) in aqueous tetrahydrofuran under nitrogen with aluminum amalgam. Isolate and purify the resultant product in a manner similar to that described in Example 2 to obtain a product comprising hydroxylaminoeverninomicin B.

B. In a manner similar to that described in Example 2, purify the crude hydroxylaminoeverninomicin B using silica gel preparative plates (2000 $\mu$ thick) and using 50% acetone in benzene as the developing solvent. Visualize the purified hydroxylaminoeverninomicin B ($R_f$ = 0.18) using ultraviolet light and extract the purified hydroxylaminoeverninomicin B band from the plate using acetone. Combine the acetone extracts and distill to a residue comprising purified hydroxylaminoeverninomicin B having the following properties:

Molecular Formula: $C_{66}H_{101}O_{35}NCl_2$; Molecular Weight: 1535 (Calc.) m.p.: 171°–173°C Kofler block.

| Combustion Analysis: | Found | Calc. (for $C_{66}H_{101}O_{35}NCl_2 \cdot 4H_2O$) |
|---|---|---|
| Carbon | 49.61% | 50.3 |
| Hydrogen | 6.63% | 6.97 |
| Nitrogen | 1.00% | 0.89 |

Specific Optical Rotation: $[\alpha]_D^{26}$ −19.9° (methanol); Ultraviolet Absorption Spectrum: $\lambda_{max}^{methanol}$ 215 m$\mu$, $\epsilon_1'$, 17.15; 299 m$\mu$, $\epsilon_1'$, 3.15.

Infrared Absorption Spectrum in chloroform: 2.9, 3.4, 5.8, 6.35, 6.9, 7.2, 8.0, 9.1 (broad -S), 9.6 (broad-S), 10.5, 11.0 microns.

EXAMPLE 5

Sodium Salt of Everninomicin 1

A. To a vigorously stirred suspension of 1 g. of everninomicin 1 in 25 ml. of water under a nitrogen atmosphere, slowly add 0.1 N-sodium hydroxide (about 6.8 ml.) until the pH of the reaction mixture is 9.5 and the solid is in solution. Stir at room temperature for an additional hour (final pH about 8.5). Lyophilize the clear solution to obtain everninomicin 1 sodium salt as a white solid.

B. In the above procedure by substituting for the sodium hydroxide equimolar quantities of other alkaline metal hydroxides (e.g. potassium hydroxide and lithium hydroxide) or by alkaline earth metal hydroxides (e.g. calcium hydroxide and barium hydroxide), there is obtained the corresponding alkali metal or alkaline earth metal salt, e.g. everninomicin 1 potassium salt, everninomicin 1 lithium salt, everninomicin 1 calcium salt and everninomicin 1 barium salt, respectively.

C. In a manner similar to that described in Example 5-A hereinabove, treat the antibacterial mixture of Example 1 with 0.1 N-sodium hydroxide. Isolate the resultant product in a manner similar to that described in Example 5-A to obtain the sodium salt of the mixture comprising everninomicin 1 and hydroxylaminoeverninomicin D.

EXAMPLE 6

N-Methyl Glucamine Salt of Everninomicin 1

A. To 300 mg. of everninomicin 1 dissolved in 1.5 ml.

of methanol, add 40 mg. of N-methyl glucamine and stir the reaction mixture at room temperature for 1½ hours. Slowly add ether (40 ml.) with good agitation. Separate the resultant precipitate by filtration and air dry to give 175 mg. of everninomicin 1 N-methyl glucamine as a white solid.

Similarly, treat the antibacterial mixture prepared in Example 1 with N-methyl glucamine in methanol. Isolate the resultant product in a manner similar to that described hereinabove to obtain the N-methyl glucamine salt of the mixture comprising hydroxylaminoeverninomicin D N-methyl glucamine salt and everninomicin 1 N-methyl glucamine salt.

The present invention includes within its scope pharmaceutical compositions comprising our novel everninomicin 1 in association with a compatible, pharmaceutically acceptable carrier or coating. Also included within our invention is the method of eliciting an antibacterial response in a warm-blooded animal having a susceptible bacterial infection which comprises administering to said animal a non-toxic, antibacterially effective amount of a member selected from the group consisting of everninomicin 1 and pharmaceutically acceptable salts of the foregoing.

The compositions may be administered parenterally, orally, or topically, parenteral administration being preferred. In carrying out the methods of this invention, the active ingredient is normally combined with conventional pharmaceutical diluents and carriers which are based upon the desired route of administration. The parenteral route is preferred, particularly with salts of everninomicin 1. In carrying out the method, the active group can, if desired, be combined with other therapeutically active compositions such as hydroxylaminoeverninomicin D and other therapeutically active compositions customarily included in antibacterial formulations. Thus, the antibacterially active mixture produced by our process when everninomicin D is treated with aluminum amalgam in aqueous tetrahydrofuran (i.e. the antibacterial mixture produced in Example 1), and salts thereof, particularly the sodium salt thereof, may be incorporated in pharmaceutical compositions together with a compatible, pharmaceutically acceptable carrier, and said compositions may be used to elicit an antibacterial response in a warm-blooded animal having a susceptible bacterial infection by administering to said animal a non-toxic antibacterially effective amount of said compositions comprising a mixture of everninomicin 1 and hydroxylaminoeverninomicin D.

The individual unit dosage and frequency of administration is determined not only by the nature and severity of the bacterial infection for which relief is sought, but also upon age, weight, species, underlying physical condition and route of administration. The exact amount to be administered should be nontoxic, yet pharmaceutically effective in alleviating the symptoms of bacterial infections. Generally, for the treatment of bacterial infections, the compositions are administered parenterally so as to give a daily dose of from 1 to about 15 mgm/kg of everninomicin 1 of this invention or mixture thereof with hydroxylaminoeverninomicin D.

The following examples illustrate pharmaceutical compositions according to the invention.

EXAMPLE 7

| Parenteral Solution | mg/ml |
|---|---|
| Everninomicin 1 | 58.14 |
| Sodium chloride | 5.0 |
| Sodium bisulfite | 1.625 |
| Sodium hydroxide (1N to pH 8.7) | 0.56 |
| Purified Water, q.s. | 1.0 ml. |

Procedure

Sparge with nitrogen about 90% of the required amount of water. With stirring, add the sodium chloride and sodium bisulfite and stir until dissolved. Add the everninomicin 1 sodium salt and with stirring add 1N sodium hydroxide until the solution reaches a pH of 8.7. Add water to make a total volume of 1 ml. filter through a sterilizing membrane. With this solution, fill multiple dose vials. Lyophilize.

EXAMPLE 8

| Parenteral Solution | mg/ml |
|---|---|
| Everninomicin 1 sodium salt | 58.14 |
| Sodium chloride | 5.0 |
| Sodium bisulfite | 1.625 |
| Sodium hydroxide (1N to pH 8.7) | 0.56 |
| Methylparaben | 1.8 |
| Propylparaben | 0.2 |
| Purified Water, q.s. | 1.0 ml. |

Procedure

Sparge with nitrogen about 90% of the required amount of water and heat the water to a temperature of about 60°–70°C. Add the methylparaben and propylparaben, stir until dissolved, then cool the solution to 25°–30°C. Then follow the procedure described in Example 8.

EXAMPLE 9

| Parenteral Suspension: | mg/ml |
|---|---|
| Everninomicin 1 | 50 |
| Sodium carboxymethylcellulose | 1.5 |
| Polysorbate 80 U.S.P. | 0.5 |
| Methylparaben | 1.8 |
| Propylparaben | 0.2 |
| Water, q.s. | 1.0 ml. |

Procedure

1. Prepare a solution of sodium carboxylmethylcellulose, polysorbate 80, U.S.P., methylparaben, and propylparaben.
2. Aseptically, slurry everninomicin 1 with a portion of the above vehicle and pass through a colloid mill.
3. Mix the milled slurry with the remainder of the vehicle.
4. Fill into sterile vials.

In above examples 7, 8 and 9, in place of everninomicin 1 or the sodium salt thereof, there may be used an equal quantity of the antibacterial mixture produced in Example 1, i.e. the mixture comprising everninomicin 1 and hydroxylaminoeverninomicin D.

EXAMPLE 10

Reaction of Everninomicin D in Aqueous Ethanol

A. To a solution of 4.5 g. of everninomicin D (purified as described in Preparation 1) in 100 ml. of 95% ethanol and 85 ml. of water, add with stirring at room temperature aluminum amalgam prepared from 810 mg. of Reynolds Wrap Aluminum Foil as described in Preparation 2. Stir the reaction mixture at room temperature until all the amalgam disappears (approximately 2 hours). Filter the gray reaction mixture on a Buchner funnel using a filter pad and wash the insoluble residue with 95% ethanol. Combine the filtrate and ethanol washings and concentrate to a volume of approximately 100 ml. Cool the concentrate in an ice bath for about an hour; separate by filtration the resulting insoluble fraction comprising 2.9 g. of hydroxylaminoeverninomicin D; dry the insoluble fraction in vacuo at room temperature prior to further purification.

B. Purification of Hydroxylaminoeverninomicin D

Purify the crude hydroxylaminoeverninomicin D (2.9 g.) obtained as described in Example 10A using 20 silica gel preparative plates (2000 $\mu$ thick) and using 50% acetone in benzene as the developing solvent. Visualize the purified hydroxylaminoeverninomicin D ($R_f$=0.44) using ultraviolet light and extract the purified hydroxylaminoeverninomicin D band (i.e. the 0.45 $R_f$ band) from the plate using acetone. Combine the acetone extracts and distill to a residue comprising 1.5 g. (33.5% yield) of purified hydroxylaminoeverninomicin D having the following properties:

Molecular Formula: $C_{60}H_{101}O_{34}NCl_2$; Molecular Weight: 1523 (calc.) m.p.: 190°–200°C Kofler block;

| Combustion Analysis | Found | Calc. |
|---|---|---|
| Carbon | 51.81% | 52.05 |
| Hydrogen | 6.64% | 6.68 |
| Nitrogen | 0.59% | 0.92 |
| Chlorine | 4.55% | 4.66 |

Specific optical rotation: $[\alpha]_D^{26}$ −39.3° (chloroform); Ultraviolet absorption: $\lambda_{max}^{methanol}$ 215 m$\mu$, $\epsilon_1'$, 19.2; 292 m$\mu$, $\epsilon_1'$, 3.4.

Infrared absorption spectrum in chloroform: 2.92, 5.80, 6.37, 6.92, 7.13, 7.26, 8.06, (broad), broad absorption between 9.13 and 9.70 microns.

Figure 4:
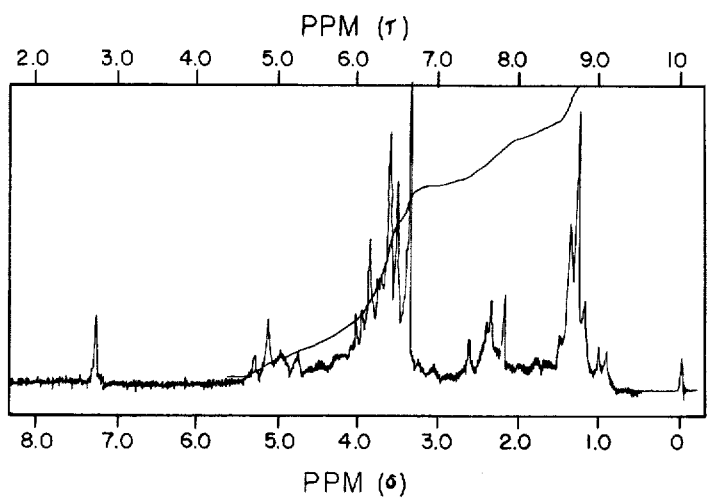

We claim:

1. A compound selected from the group consisting of a composition of matter identified as everninomicin 1, the pharmaceutically acceptable mono-cationic salts and the N-methyl glucamine acid addition salt thereof, said everninomicin 1 having a phenol substituent, and being an organic substance effective in inhibiting the growth of grampositive bacteria and having the following physical characteristics: elemental analysis: 50.36, 50.77%; H=6.50, 6.68%; Cl=4.7%, N=none; that has a neutralization equivalent equal to 1587 with a pKa of 7.4; that has a specific optical rotation of −28.5° as measured in dioxane at 1% concentration by the D-line of sodium at 25°C; is soluble in tetrahydrofuran, acetonitrile, acetone, dimethylformamide, benzene; is insoluble in water, hexane; that has an Rf value of 0.79 in a 60% acetone 40% benzene system when chromatographed on a thin layer plate having 2000 $\mu$ silica gel; that has an ultraviolet absorption maximum at 293 m$\mu$ with $E^{1\%}$ in methanol equal to about 43.7 and has an ultraviolet absorption maximum at 295 m$\mu$ with $E^{1\%}$ in methanolic sodium hydroxide equal to about 139; has an infra-red absorption spectrum when dissolved in chloroform substantially as shown in FIG. 3; has a nuclear magnetic resonance when dissolved in chloroform substantially as shown in FIG. 4; has a melting point of about 150°–160°C when measured on a Kofler block; and has an antibacterial spectrum including the bacteria enumerated as set forth in Table I; and said pharmaceutically acceptable salts being salts of the phenol substituent in everninomicin 1.

2. The compound of claim 1 identified as everninomicin 1.

3. The compound of claim 1 which is the sodium salt of everninomicin 1.

* * * * *

UNITED STATES PATENT OFFICE
CERTIFICATE OF CORRECTION

PATENT NO. : 3,901,973
DATED : August 26, 1975
INVENTOR(S) : Howard E. Harris, deceased et al.

It is certified that error appears in the above-identified patent and that said Letters Patent are hereby corrected as shown below:

Column 4, line 53, "441,548, filed" should read ---411,548, filed---.  Column 8, line 51, "441,548, filed" should read ---411,548, filed---.

Signed and Sealed this twenty-fifth Day of November 1975

[SEAL]

Attest:

RUTH C. MASON
Attesting Officer

C. MARSHALL DANN
Commissioner of Patents and Trademarks